United States Patent

[11] 3,571,522

[72] Inventor Leslie A. Cox
Point Claire, Quebec, Canada
[21] Appl. No. 779,787
[22] Filed Nov. 29, 1968
[45] Patented Mar. 16, 1971
[73] Assignee Bell Telephone Laboratories, Incorporated
Murray Hill, Berkeley Heights, N.J.

[54] TONE DETECTOR
14 Claims, 3 Drawing Figs.

[52] U.S. Cl. .......... 179/84, 325/38, 328/138, 329/145
[51] Int. Cl. .......... H03d 3/02, H04m 1/50
[50] Field of Search .......... 179/84 (VF); 340/171; 329/145; 328/137, 138; 325/38.1

[56] References Cited
UNITED STATES PATENTS
2,716,189 8/1955 Ayres .......... 328/138X
3,071,727 1/1963 Kitsopoulos .......... 325/38(.1)
3,100,875 8/1963 Peterson .......... 329/145

*Primary Examiner*—Kathleen H. Claffy
*Assistant Examiner*—William A. Helvestine
*Attorneys*—R. J. Guenther and James Warren Falk

ABSTRACT: An inband signal tone detector is described in which an incoming signal is compared with the same signal delayed for a fixed time to determine degree of alternation asymmetry of the incoming signal. The result of the comparison is evaluated to detect the presence of the signal tone and the absence of all other signals.

INVENTOR
L.A. COX
BY J. S. Cubert
ATTORNEY

TONE DETECTOR

BACKGROUND OF THE INVENTION

My invention is related to signaling arrangements and more particularly to inband signaling detectors in communication systems.

Voice communication systems in which a plurality of stations are selectably interconnected through a switching network usually require some form of signaling to transmit interconnection and supervisory information to control the network connections. Such signaling may be accomplished within the voice frequency band. This advantageously ensures the transmission path is satisfactory for voice signals. Inband signaling also utilizes the equipment and transmission path already provided for voice transmission for signaling. Additionally, the inband signaling information is unaffected by the variety of transmission facilities which may be encountered along the transmission path.

An example of inband signaling, well known in the art, is single frequency signaling. In systems which include this type of signaling, a single frequency tone modified in accordance with appropriate interconnection and supervisory information conveys the control information via the voice path. The single tone is detected at the network control equipment and the detected control information is used to alter the state of the switching network. Since voice signals may also contain the single frequency used for signaling, the tone detector must be constructed so that the tone signals are detected but voice signals are rejected. Otherwise the voice signals containing the single frequency used for signaling may cause false operation of the associated network control equipment.

In one type of single frequency tone detector known in the art, the incoming signal is applied to two paths. One path includes a narrowband filter which passes only frequencies in the neighborhood of the single frequency. The other path includes a wideband filter which passes all voice frequency signals except those in the neighborhood of the single frequency signaling tone. The outputs of these two paths are compared so that the network control equipment is activated only if the ratio of the amplitude of the narrowband signal to the amplitude of the wideband signal is greater than a predetermined value. In this way, guard action is provided which prevents the false operation of the associated control equipment.

Another single frequency tone detecting circuit known in the art detects the presence of a single frequency sinusoid tone by comparing the time of occurrence of immediately successive zero crossings derived from incoming signals. The zero crossings are detected and pulses representing the zero crossings are delayed by a half period of the single frequency tone. The delayed zero crossing pulses are then compared to the immediately received zero crossing pulses from the incoming signal. The coincidence of the immediately received zero crossing pulses and the delayed incoming zero crossing pulses over a prescribed period of time indicates the presence of only the single frequency signal. This arrangement, however, operates on a limited sampling of the incoming signal since only the portion of the incoming signal in the neighborhood of the zero crossings is inspected. Because of the limited sampling, voice frequency signals, distinguishable from the single frequency but having the desired zero crossing property, may be gated to the associated network control equipment.

It is known from experimental evaluation that voice frequency signals are distinguishable from single frequency sinusoids because of the difference in symmetry properties of the two types of signals over successive equal length periods. A single frequency sinusoid is symmetrical with respect to such successive periods. This type of symmetry is known as odd symmetry or alternation symmetry. Voice signals are characterized by a pronounced degree of asymmetry between immediately successive equal length periods. This difference in signal symmetry may be advantageously used to distinguish voice signals from a tone signal without the need for the aforementioned guard action and the resulting detection is more reliable than the zero cross coincidence method because substantially the entire signal is inspected.

SUMMARY OF THE INVENTION

My invention is a circuit for detecting the presence of only a signaling tone in an incoming signal in which the incoming signal is delayed for a fixed period of time. This period may appropriately correspond to one half period of the expected tone frequency. The delayed signal and the incoming signal are each applied to a comparator which determines the degree of asymmetry in the incoming signal over the successive fixed periods. The output of the comparator is applied to a signal producing circuit which operates to evaluate the degree of odd or alternation symmetry in the incoming signal by further comparing the comparator output to a predetermined signal. The predetermined signal is related to the maximum permissible alternation asymmetry. The signal-producing circuit applies an output signal to associated network control equipment only if the signal indicating the degree of asymmetry is less than the predetermined value. In this way, according to my invention, the presence of only the signaling tone in the incoming signal activates associated control equipment.

According to one aspect of my invention, the signal producing circuit for determining the degree of alternation asymmetry is a comparator in which the output of the preceding comparator is checked against a preassigned signal.

In an illustrative embodiment of this aspect of my invention, an incoming signal is applied directly to one input of an analogue adder circuit. The incoming signal is coupled directly to one input of this adder and is applied to the second input of the adder after it is delayed by a passive delay circuit for one half period of the expected tone frequency. The output of the adder, which is directly related to the alternation asymmetry between successive half cycles of the incoming signal, is then compared to a fixed DC potential representing the maximum permissible alternation asymmetry of a signaling tone. The comparator output is then applied to network control equipment.

According to another aspect of my invention, the circuit for determining the degree of alternation asymmetry includes a peak detector connected to the output of the preceding comparator and a peak detector connected to the incoming signal source. In this arrangement, the peak alternation asymmetry of the incoming signal is checked against the peak value of the incoming signal for the preceding period so that variations in amplitude of the incoming signal do not affect the detection of the signaling tone.

In an illustrative embodiment of this aspect of my invention, the incoming signal and the delayed incoming signal are applied to a linear amplifier having a gain that makes the amplifier output signal equal to the peak amplitude of the incoming signal when the maximum permissible alternation asymmetry is reached. The maximum amplifier output signal is stored in a peak detector and the maximum amplitude of the incoming signal is stored in a separate peak detector. The outputs of the two peak detectors are compared directly in an analogue-type amplitude comparator and the comparator output is used to control the operation of network control equipment.

According to yet another aspect of my invention, a plurality of incoming signals are time division multiplexed so that at least one complete cycle of each incoming signal is applied to a digital detector arrangement. The multiplexed incoming signal is repeatedly sampled and converted into a succession of pulse code modulated codes. The maximum value code is stored and an alternation asymmetry code is derived from an adder to which the successive codes and the successive one half cycle delayed codes are applied. The maximum alternation asymmetry code is also stored and compared to the maximum allowable alternation asymmetry code. The output of the comparator is applied to network control equipment which may be arranged to separate the multiplexed signals.

DETAILED DESCRIPTION

Figure 1:
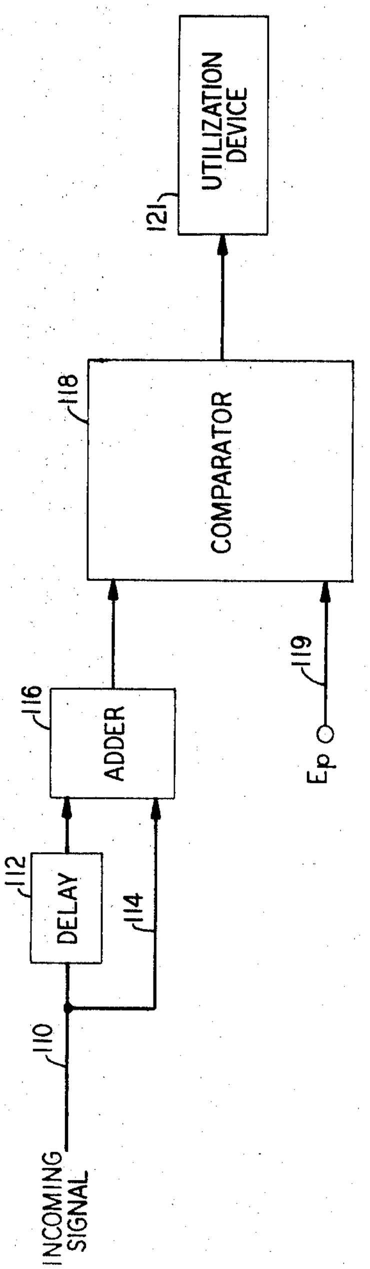
FIG. 1 depicts an illustrative embodiment of my invention useful in detecting fixed amplitude incoming signals.

Referring to FIG. 1, an incoming signal consisting of voice signals or a signaling tone is applied to line 110. The circuit of FIG. 1 discriminates between the two types of signals so that only tones having frequencies in the neighborhood of an expected signaling frequency cause a signal to be applied to utilization device 121 which may comprise network control equipment. Voice signals, however, are not permitted to alert device 121. The incoming signal is applied directly to a comparator such as adder 116 via line 114 and is also applied to delay 112. The delay time of delay 112 is adjusted to be equal to a time period corresponding to one half cycle of the expected signaling tone frequency. Thus, both the incoming signal and the delayed incoming signal are applied to adder 116. Adder 116 operates to compare the signals applied thereto so that the output of the adder represents the alternation asymmetry of the incoming signal.

In general, the incoming signal may be expressed as a function $f(t)$ so that the output of adder 116 is $$e(t)=f(t)+f\left(t-\frac{\pi}{\omega_0}\right), \qquad (1)$$

where $e(t)$ is the alternation asymmetry signal, $f(t)$ is the incoming signal applied via line 114 and $f(t-\pi/\omega_0$ is the signal applied to adder 116 via delay 112. If the incoming signal is a single frequency sinusoid of frequency $\omega_0$, the output of the adder is zero. This is so because of the symmetry between successive half cycles of frequency $\omega_0$. If $f(t)$ represents a complex voice signal, however, this symmetry relationship is no longer true and a nonzero error signal appears at the output of adder 116. In this way voice signals can be distinguished from the desired frequency tone $\omega_0$.

It is possible, however, for the single frequency tone to have a frequency $\omega_1$ which deviates somewhat from $\omega_0$ but represents a permissible tone frequency signal. The asymmetry signal resulting from a sinusoid of frequency $\omega_1$ is then $$e(t)=\sin \omega_1 t+\sin\left(\omega_1 t-\frac{\omega_1}{\omega_0}\pi\right). \qquad (2)$$

By using well-known trigonometric identities, the asymmetry signal $e(t)$ can be expressed as $$\left(-\sin\frac{\omega_1}{\omega_0}\pi\right)\cos \omega_1 t+\left(1+\cos\frac{\omega_1}{\omega_0}\right)\sin \omega_1 t. \qquad (3)$$

This equation can be further converted into a form in which the peak amplitude of the error signal, $E_p$, is a separate factor as in Equation (4).

$e(t)=E_p \sin(\omega_1 t+\chi)$. (4) Using the terms of Equation (3) the peak amplitude $E_p$ becomes $$E_p=\sqrt{\sin^2\frac{\omega_1}{\omega_0}\pi+\left[1+\cos\frac{\omega_1}{\omega_0}\pi\right]^2}. \qquad (5)$$

Equation (5) may be further transformed by means of trigonometric identifies so that the deviation in frequency from the center frequency $\omega_0$ is expressly shown as in Equation (6).

$$E_p=\left|-2\sin\frac{\pi}{2}\left(\frac{\omega_1}{\omega_0}-1\right)\right|. \qquad (6)$$

Where $\omega_1$ is very close in value to $\omega_0$, the error signal may be expressed as $$E_p\cong\pi\Delta R. \qquad (7)$$

This is true when $$\Delta R=\frac{\omega_1}{\omega_0}-1$$

is substantially less than unity.

It is apparent from the foregoing that an incoming signal consisting of a single frequency tone and odd harmonics thereof passes the symmetry test of Equation (7) but is not a single frequency tone. Where, as is common in telephone systems, the tone frequency is 2,600 Hz., the odd harmonics are outside the normal voiceband of a telephone transmission path so that the presence of such harmonics does not affect the asymmetry detection. Even if the odd harmonics are within the voiceband, the resulting incoming signal is still distinguishable from voice signals and the harmonics may be taken into account in evaluating the alternation asymmetry of an acceptable signaling tone.

The output of adder 116, which represents the instantaneous asymmetry signal $e(t)$, is applied to one input of comparator 118. The other input to comparator 118 is a DC signal corresponding to the peak error signal $E_p$ of Equation (7) for the maximum permissible value of $\omega_1$. The output signal on lead 123 from comparator 118 is applied to utilization device 121 so that device 121 is rendered operative only if the asymmetry error signal from adder 116 is less than or equal to the maximum asymmetry voltage, $E_p$, applied to lead 119.

Figure 2:
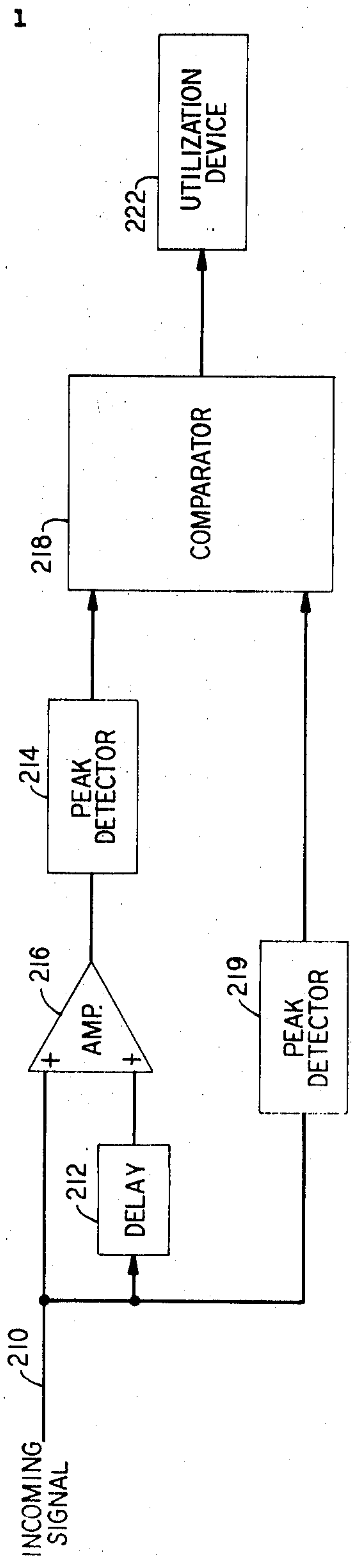
FIG. 2 depicts another illustrative embodiment of my invention useful in detecting variable amplitude incoming signals.

While the circuit of FIG. 1 operates to distinguish signaling tones from voice signals, it is limited by the requirement that the peak amplitude of the incoming signal be fixed. This is so because a fixed predetermined value of peak asymmetry signal, $E_p$, is used to control the output of comparator 118. Since the amplitude of the incoming signal may not be known, it is desirable to construct a circuit which is not limited in this respect. Such a circuit is shown in FIG. 2. In this circuit, the peak asymmetry signal $E_p$ is made proportional to the amplitude of the incoming signal.

Referring to FIG. 2, an incoming signal is applied to line 210. Comparator 218 control the operation of utilization device 222 so that only the desired signaling tone causes an enabling signal to be applied thereto. The incoming signal is applied directly to one input of amplifier 216 and a delayed incoming signal is applied to the other input of amplifier 216 via delay 212.

As in the circuit of FIG. 1, the delay of delay 212 is fixed at one half the period of the expected tone frequency $\omega_0$. The directly applied and delayed incoming signals are added together in analogue fashion in amplifier 216 so that the output therefrom is directly related to the alternation asymmetry of the incoming signal. The output from amplifier 216, according to my invention, may be used to distinguish between voice signals and signaling tones. The maximum permissible asymmetry $E_p$ is known from Equation (7) once the largest deviation frequency $\omega_1$ of the signaling tone is determined. The asymmetry signal may be expressed as the ratio $E_p/A$ where $A$ is the peak amplitude of an incoming tone. The gain of amplifier 216 can be adjusted to be $A/E_p$ so that the maximum permitted asymmetry signal output from amplifier 216 in the presence of an allowable tone is $A$.

Peak detector 214 operates to detect and store the maximum error signal from amplifier 216. The output of peak detector 214 is then applied to one input of comparator 218. The second input to comparator 218 is connected to the output of peak detector 219 which operates to detect and store the peak amplitude of the incoming signal. The output of comparator 218 applies a signal to device 222 only if the peak asymmetry signal from detector 214 is less than or equal to the signal from detector 216. This is so because the output from amplifier 216 has been scaled with respect to the amplitude of the incoming signal by approximately selecting the gain of amplifier 216. Thus, if the alternation asymmetry between successive half cycles of the incoming signal is less than or equal to $E_p$, the output of amplifier 216 is less than or equal to $A$ and comparator 218 provides a signal to device 222. If the asymmetry between successive half cycles of the incoming signal results in an asymmetry signal greater than $E_p$, no output from comparator 218 is coupled to device 222. Because of the gain of amplifier 216 and the insertion of peak detectors 214 and 219, the operation of the circuit of FIG. 2 is independent of the amplitude of the incoming signal.

The circuits of FIGS. 1 and 2 operate directly on the incoming signal to detect signaling tones. It is sometimes desirable, however, to convert the incoming signals into a succession of digital codes and to perform the detection operations on the codes. This is true, for example, when the incoming signals can be time division multiplexed so that a single digital tone detector circuit may serve a plurality of incoming signal lines. The digital circuitry is then more economical than the plurality of analogue circuits that would otherwise be required.

Figure 3:
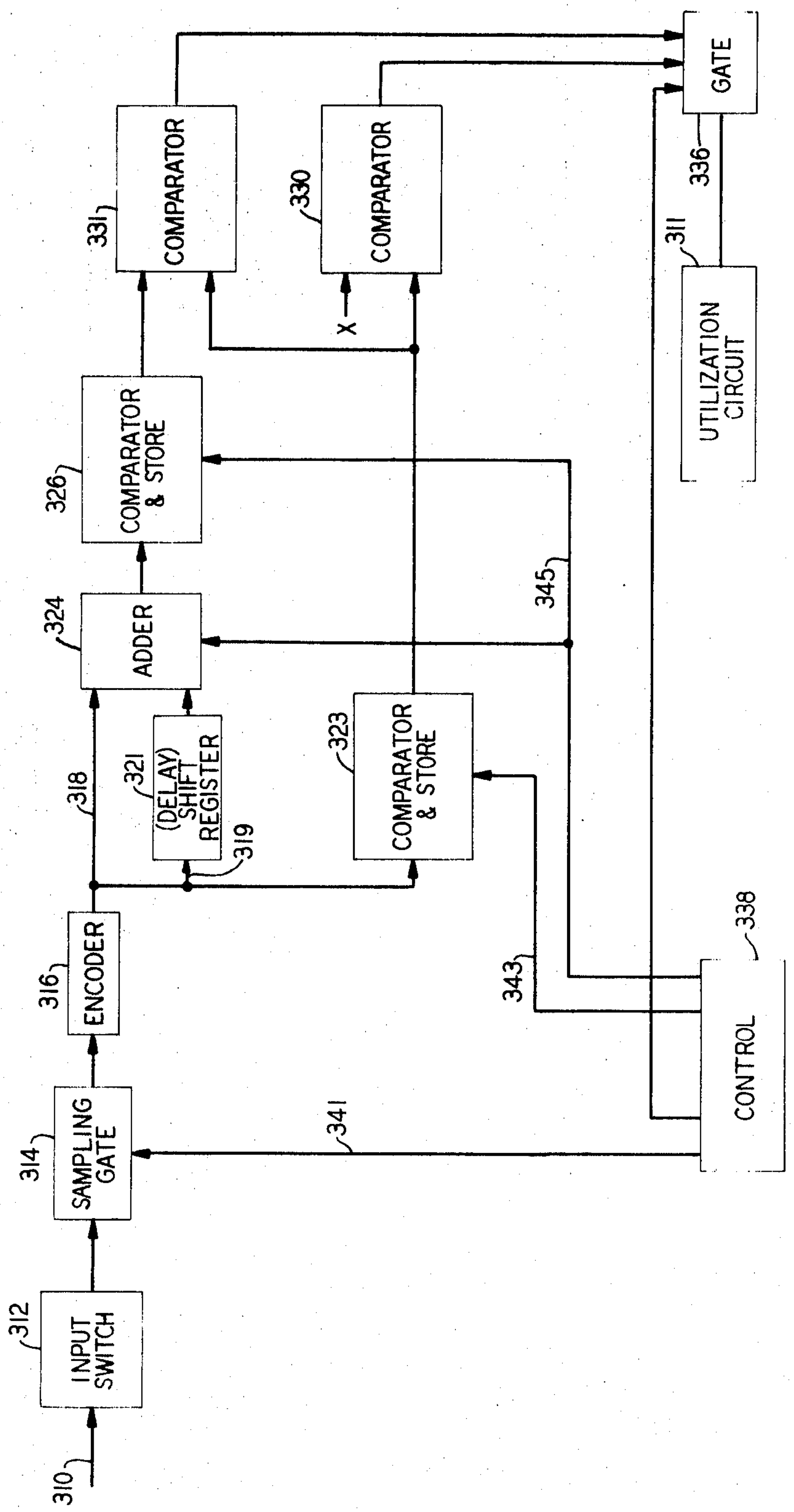
FIG. 3 depicts still another embodiment of my invention in which digital and time division multiplex arrangements are employed to detect a plurality of variable amplitude incoming signals.

FIG. 3 illustrates a digital tone detector circuit which performs substantially the same function as the analogue circuit of FIG. 2. In FIG. 3, incoming signals are applied to an input switch 312 which may be a time division multiplex switch via cable 310. Input switch 312 sequentially selects incoming signals. A particular incoming signal is selected for an interval of time corresponding to one or more cycles of the expected signaling tone frequency. Switch 312 operates, during this interval, to apply the selected incoming signal to sampling gate 314. Control 338 generates sampling pulses so that the multiplexed incoming signal applied during the multiplex interval is divided into a group of pulse amplitude modulated signals. The PAM signals from gate 314 are then applied to encoder 316 which converts each successive sampling signal into a pulse code modulated code corresponding to the value of the amplitude of the incoming signal sample. The PCM code from encoder 316 is in turn applied to comparator and store circuit 323, adder 324, and shift register 321.

Comparator and store circuit 323 is initially reset at the beginning of the multiplex interval by a signal transmitted via lead 343 from control 338 whereby the store may receive the codes corresponding only to the particular incoming signal selected. The resetting operation is appropriately timed so that it does not interfere with sampling. The second successive code from encoder 316 in the interval is compared to the first code which is initially stored in circuit 323. The greater of the two successive codes is then stored. Each successive code is then compared to the one just stored code and the greater of the two is stored for further comparison. In this way, the store of circuit 323 contains the largest value code of the incoming signal at the end of each half cycle. Circuit 323 is reset after every successive half cycle of the multiplex interval. Thus, after the first full cycle is completed and after each half cycle thereafter, the peak amplitude of the presently sampled incoming signal appears at the output of circuit 323. This peak amplitude code is applied to comparator 330 in which it is then compared to a predetermined code X. Code X represents the maximum expected noise level on cable 310. It may alternatively represent the minimum acceptable incoming signal amplitude. If the output of circuit 323 is less than the expected noise, comparator 330 applies an inhibiting signal to gate 336 so that noise signals on cable 310 are prevented from activating utilization device 311; otherwise an enabling signal is applied to gate 336.

The output of encoder 316 is applied directly to adder 324 via lead 318. Shift register 321 receives successive codes from encoder 316 via lead 319 and provides a delay corresponding to one half cycle of the expected tone so that codes occurring during successive half cycles of the expected tone can be compared. It is to be understood, however, that other delay devices may be used in place of shift register 321. Gate 336 and adder 324 are inhibited during the first half cycle of each interval by a signal from control 338. At the beginning of the second half cycle, gate 336 is enabled. The output from adder 324 is a code related to the asymmetry of the incoming signal. This code is applied to comparator and store circuit 326 which compares immediately successive codes from adder 324 and stores the largest code therefrom as described with respect to circuit 323. Circuit 326 is initially reset at the beginning of the multiplex interval so that only codes corresponding to the incoming signal of the present multiplex interval are stored. It is also cleared after each half cycle of the interval.

At the end of each successive half cycle after the first half cycle, the output of circuit 326 contains a code corresponding to the maximum alternation asymmetry of the incoming signal. This asymmetry signal is applied to comparator 331 together with a code corresponding to the maximum amplitude of the incoming signal. As in the circuit of FIG. 2, comparator 331 operates to determine whether or not the asymmetry signal from circuit 326 is sufficient to block gate 336. This is done in accordance with the maximum permissible asymmetry signal determined from Equation (7). If the asymmetry signal from circuit 326 is less than or equal to an appropriately scaled code received from circuit 323, the output of comparator 331 enables gate 336 so that utilization device 311 is enabled. If the asymmetry code is greater than that determined by Equation (7), gate 336 is blocked. Gate 336 is enabled only if the incoming signal is greater than the maximum expected noise code X and also meets the alternation asymmetry requirements set up by Equation (7).

At the end of the time interval, an incoming signal from a separate source can be applied via input switch 312 to the tone detector so that the detection operation may be repeated on a different incoming signal. In this way a large number of incoming signals may be operated upon by the same detector circuit arrangement. Where a 2,600 Hz. signaling tone is used, it has been found that 16 equally spaced samples may be successfully used to detect the signaling tone contained in each incoming signal. The 16 samples over a period of 385 microseconds provide sufficient information to distinguish between voice signals and signaling tones in a given incoming signal.

The number of incoming signals that may be accommodated by a single digital tone detector is related to the reaction time of the system. Where each tone can be sampled once every 15 milliseconds without the loss of the supervisory and control information carried therein, 39 incoming signals may be time division multiplexed in input switch 312 to operate the tone detector of FIG. 3. In this way, the supervisory and control information carried by the signaling tones from a plurality of sources are operative to control utilization device 311 which may comprise network control equipment adapted to operate from multiplexed output signals.

My invention has been described with reference to specific illustrated embodiments. It is to be understood that numerous other arrangements and modifications may be devised by those skilled in the art without departing from the spirit and scope of the invention.

I claim:

1. A circuit for detecting a tone signal comprising means for receiving an incoming signal, means connected to said receiving means for delaying said received signal for a fixed period of time, means for comparing said received signal with said delayed received signal comprising means for linearly combining said received signal and said delayed received signal, and means responsive to the signal from said linearly combining means for selectively producing a signal indicating the presence of only said tone signal in said incoming signal.

2. A circuit for detecting a tone signal according to claim 1 wherein said delaying means comprises a delay corresponding to one half cycle of the expected frequency of said tone signal.

3. A circuit for detecting a tone signal according to claim 2 wherein said linearly combining means comprises means for linearly adding said received and delayed signals and said signal producing means comprises means responsive to the output signal of said adding means being less than a preassigned value signal for producing an output signal.

4. A circuit for detecting a tone signal according to claim 2 wherein said linear combining means comprises amplifying means having first and second inputs and an output, said first input being connected to said receiving means, said second input being connected to said delaying means, and further comprising means for detecting the peak amplitude of said received signal occurring within each half cycle, and means for detecting the peak amplitude signal from said amplifying means output occurring within said half cycle, and wherein said signal-producing means comprises means for comparing said received signal peak amplitude with said amplifying means output peak amplitude.

5. A circuit for detecting a tone signal according to claim 4 wherein each of said detecting means further comprises means for storing said detected peak amplitude signal and said signal producing means comprises means for comparing said stored received signal peak amplitude with said stored amplifier output signal peak amplitude.

6. A circuit for detecting a tone signal according to claim 5 wherein the gain of said amplifying means is fixed at a value permitting direct comparison of said stored peak amplitudes, and said signal-producing means is operative to produce a signal only when the stored peak amplitude of said amplifying means output signal is less than or equal to said stored received signal peak amplitude.

7. A circuit for detecting a tone signal according to claim 1 wherein said means for receiving an incoming signal comprises means for time sampling said incoming signal and encoding means for converting said sampled signal into a pulse code modulated code corresponding to the value of the amplitude of said incoming signal.

8. A circuit for detecting a tone signal comprising means for time sampling an incoming signal, encoding means for converting said sampled signal into a pulse code modulated code corresponding to the value of the amplitude of said incoming signal, means for comparing said pulse code modulated code with a pulse code modulated code representative of a prior incoming signal, and means responsive to said comparing means for indicating the presence of only said tone signal in said incoming signal.

9. A circuit for detecting tone signals comprising means for receiving at least one incoming signal, means for repetitively sampling each incoming signal during an associated signal period, means connected to said sampling means for generating successive codes corresponding to successive sampled signals from said sampling means, first means connected to said generating means for detecting and storing the maximum of said generated codes in each associated signal period, means for delaying successive codes from said generating means for a predetermined time, means for successively adding said delayed codes to said just generated codes, second means connected to said adder for detecting and storing the maximum value code from said adder in each associated signal period, and means for comparing the maximum code from said first means to the maximum code from said second means, said comparing means producing an output signal only when said second means maximum code is less than or equal to said first means maximum code.

10. A circuit for detecting tone signals according to claim 9 wherein said receiving means comprises means for receiving a plurality of incoming signals, and time division multiplexing means for sequentially applying at least one cycle of each incoming signal to said sampling means in successive multiplex time intervals.

11. A circuit for detecting tone signals according to claim 10 wherein said first and second detecting and storing means each further comprises means responsive to said multiplexing means for resetting said stored maximum code at the beginning of each of said multiplex time intervals.

12. A circuit for detecting tone signals according to claim 11 further comprising means connected to said comparing means responsive to a signal from said multiplex means at the beginning of each of said intervals for inhibiting the operation of said adder and for inhibiting said output signal for said predetermined time.

13. A circuit for detecting a single frequency sinusoidal signal comprising means for receiving an incoming signal within the voice signal frequency band, means for delaying said incoming signal for one half cycle of said single frequency, first means for comparing said received incoming signal with said delayed incoming signal, means for detecting the peak amplitude of said first comparing means occurring in each half cycle, and means for generating a signal indicative of the presence of only said single frequency sinusoidal signal in said incoming signal comprising means for detecting the peak amplitude of said received incoming signal occurring in each half cycle and second means for comparing said detected incoming signal peak amplitude with the detected peak amplitude derived from said first comparing means.

14. A circuit for detecting the presence of only a tone signal having a fundamental frequency and odd harmonic frequency components in an incoming signal comprising means for delaying an incoming signal for one half cycle of said fundamental frequency, means for adding said delayed incoming signal and said incoming signal, means for detecting the peak amplitude of said adding means output in each half cycle, means for detecting the peak amplitude of said incoming signal in each half cycle and means for comparing said detected peak amplitude derived from said adding means output signal to said detected incoming signal peak amplitude.